United States Patent [19]
Fowler et al.

[11] Patent Number: 5,527,237
[45] Date of Patent: Jun. 18, 1996

[54] CONTROL SYSTEM/METHOD FOR DEFAULT START GEAR RATIO SELECTION

[75] Inventors: Paul M. Fowler, Ascot; Anthony Stasik, Coppull; Jeffrey P. Hawarden, Rossendale; Michael D. Whitehead, Manchester; Robert S. Wheeler, Preston, all of England

[73] Assignee: Eaton Corporation, Cleveland, Ohio

[21] Appl. No.: 420,968

[22] Filed: Apr. 13, 1995

[30] Foreign Application Priority Data

May 5, 1994 [GB] United Kingdom .................. 9408885
May 5, 1994 [GB] United Kingdom .................. 9408886
May 5, 1994 [GB] United Kingdom .................. 9408924

[51] Int. Cl.⁶ .................................................. B60K 41/08
[52] U.S. Cl. ........................................... 477/142; 477/78
[58] Field of Search ............................. 477/75, 78, 134, 477/142

[56] References Cited

U.S. PATENT DOCUMENTS

| | | | |
|---|---|---|---|
| 4,648,290 | 3/1987 | Dunkley et al. ......................... | 74/866 |
| 4,735,109 | 4/1988 | Richards et al. ......................... | 74/745 |
| 4,754,665 | 7/1988 | Vandervoort .............................. | 74/745 |
| 4,800,360 | 1/1989 | Dunkley et al. ......................... | 340/52 |
| 4,817,776 | 4/1989 | Tateno et al. ............................. | 477/78 |
| 4,930,078 | 5/1990 | Dunkley et al. ..................... | 364/424.1 |
| 4,930,081 | 5/1990 | Dunkley et al. ..................... | 364/424.1 |
| 5,385,515 | 1/1995 | Chan et al. ................................. | 477/75 |

*Primary Examiner*—Dirk Wright
*Attorney, Agent, or Firm*—Howard D. Gordon

[57] ABSTRACT

A control system and method for automated mechanical transmission systems (10) of the type interpreting a first predetermined combination of parameters as a request or requirement for a direct shift to a predetermined default start ratio ($GR_{DS}$) is provided. The control provides a predetermined series of actions by which the vehicle operator may manually select a new default start ratio such as, for example, by manipulation of shift selection device (1) displaceable in a first direction to select upshifts and in a second direction to select downshifts.

24 Claims, 4 Drawing Sheets

5,527,237

CONTROL SYSTEM/METHOD FOR DEFAULT START GEAR RATIO SELECTION

BACKGROUND OF THE INVENTION

1. Related Applications

This application claims priority from GB 9408885.3, GB 9408886.1 and GB 9408924.0, all filed May 5, 1994.

This application is related to the following pending cases, all assigned to EATON CORPORATION, the assignee of this application:

U.S. Ser. No. 07/935,937 filed Aug. 27, 1992 START GEAR RATIO CONTROL SYSTEM AND METHOD, now allowed U.S. Ser. No. 08/104,698 filed Aug. 11, 1993 START RATIO SELECTION CONTROL SYSTEM AND METHOD, now U.S. Pat. No. 5,415,604

U.S. Ser. No. 08/104,699 filed Aug. 11, 1993 SCROLLING GEAR RATIO SELECTION CONTROL SYSTEM AND METHOD, now U.S. Pat. No. 5,416,700

U.S. Ser. No. 08/146,995 filed Nov. 2, 1993 METHOD AND APPARATUS FOR SELECTING A STARTING GEAR IN AN AUTOMATED MECHANICAL TRANSMISSION, now U.S. Pat. No. 5,406,862

2. Field of the Invention

The present invention relates to a control system and method for an at least partially automated vehicular mechanical transmission system, including a manually operated shift selector, for automatically controlling the changing or shifting of transmission gear ratios on a vehicle, including automatically executing automatically determined and displayed allowable driver-selected transmission ratio shifts. In particular, the present invention relates to a system and method for controlling an at least partially automated vehicular mechanical transmission system wherein various operator actions and/or system conditions, such as, for example, a single downshift request made at a time when the vehicle is at rest, the master clutch is disengaged and the transmission is engaged in a relatively high (non-start) ratio and/or a single upshift request made at a time when the vehicle is at rest, the master clutch is disengaged and the transmission is in transmission neutral, are interpreted as a request for and/or are executed as a direct shift into a preselected default start ratio.

More particularly, the present invention relates to fully or partially automated mechanical transmission system having a plurality of available start from stop ratios and at least one mode to shift directly into a preselected default start ratio wherein the preselected default start ratio is quickly and easily programmed by the vehicle operator.

DESCRIPTION OF THE PRIOR ART

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Examples of such transmissions may be seen by reference to U.S. Pat. Nos. 3,961,546; 4,081,065; 4,361,060; 5,050,079 and 5,109,729, the disclosures of which are incorporated herein by reference. Such fully automatic change-gear transmissions may be unsatisfactory in certain situations, as many vehicle operators wish to control the selection of gear ratios, particularly since they can see the road ahead and/or know the nature of the load being carried.

The above drawbacks have been minimized by providing a semi-automatic mechanical transmission control wherein automatic changing between a plurality of gear ratios is provided while normally permitting the driver to choose when to make a particular gear ratio change and whether to select the immediately consecutive ratio up or down or to skip one or more ratios. Examples of such a semi-automatic transmission control can be seen by reference to U.S. Pat. Nos. 4,648,290; 4,800,360; 4,930,081; 4,930,078 and 5,385,515, the disclosures of which are incorporated herein by reference.

While the above-described semi-automatic mechanical transmission control does provide a very desirable control, the control was subject to improvement as, if the driver or operator desired a shift into a selected transmission start ratio while the vehicle was at rest, the driver was required to identify the currently engaged ratio, to calculate the number of steps from the currently engaged ratio to the selected start ratio and to then move the selector lever that number of times in the upshift downshift direction. This was of particular concern in modern mechanical transmissions for heavy-duty vehicles having 9, 10, 12, 13, 16 or 18 forward speed ratios, wherein any one of the first seven ratios were appropriate start ratios under certain conditions. Examples of such multi-speed mechanical transmissions may be seen by reference to U.S. Pat. Nos. 4,735,109 and 4,754,665, the disclosures of which are incorporated herein by reference.

The drawbacks of the prior art semi-automatic mechanical transmission control have been minimized by the provision of controls and control methods wherein the control unit will interpret various combinations of vehicle conditions and operator actions as a request for a downshift or upshift directly into a default start ratio. If the vehicle operator was not satisfied with the default ratio, the operator could then shift from the preselected ratio into any allowable start-from-stop ratio. An example of such control may be seen by reference to aforementioned U.S. Pat. No. 5,385,515.

While these controls are improvements, these controls are not totally satisfactory as the preselected default start ratio may not be the specific ratio desired by the operator in view of desired vehicle performance, vehicle loading, operating terrain, weather conditions and the like.

SUMMARY OF THE INVENTION

In accordance with the present invention, the drawbacks of the prior art are overcome or minimized by the provision of a control system and method for allowing the vehicle operator to quickly and easily program a default start ratio which will remain the default start ratio until a new default start ratio is programmed by the operator. Of course, only permissible start-from-stop ratios may be programmed as default start ratios.

Accordingly, it is an object of the present invention to provide a new and improved control system/method for automated mechanical transmissions having a control for automatically determining allowable upshifts and downshifts from a given gear ratio, preferably for automatically displaying same, for automatically executing such permissible gear ratio changes upon selector lever manual selection thereof by the vehicle operator, and wherein the operator may request an automatic shift directly into a selected default start ratio, preferably by a single movement of the selector lever, and the default start ratio is easily and quickly programmed by the vehicle operator.

DESCRIPTION OF THE PREFERRED EMBODIMENT

Figure 1:
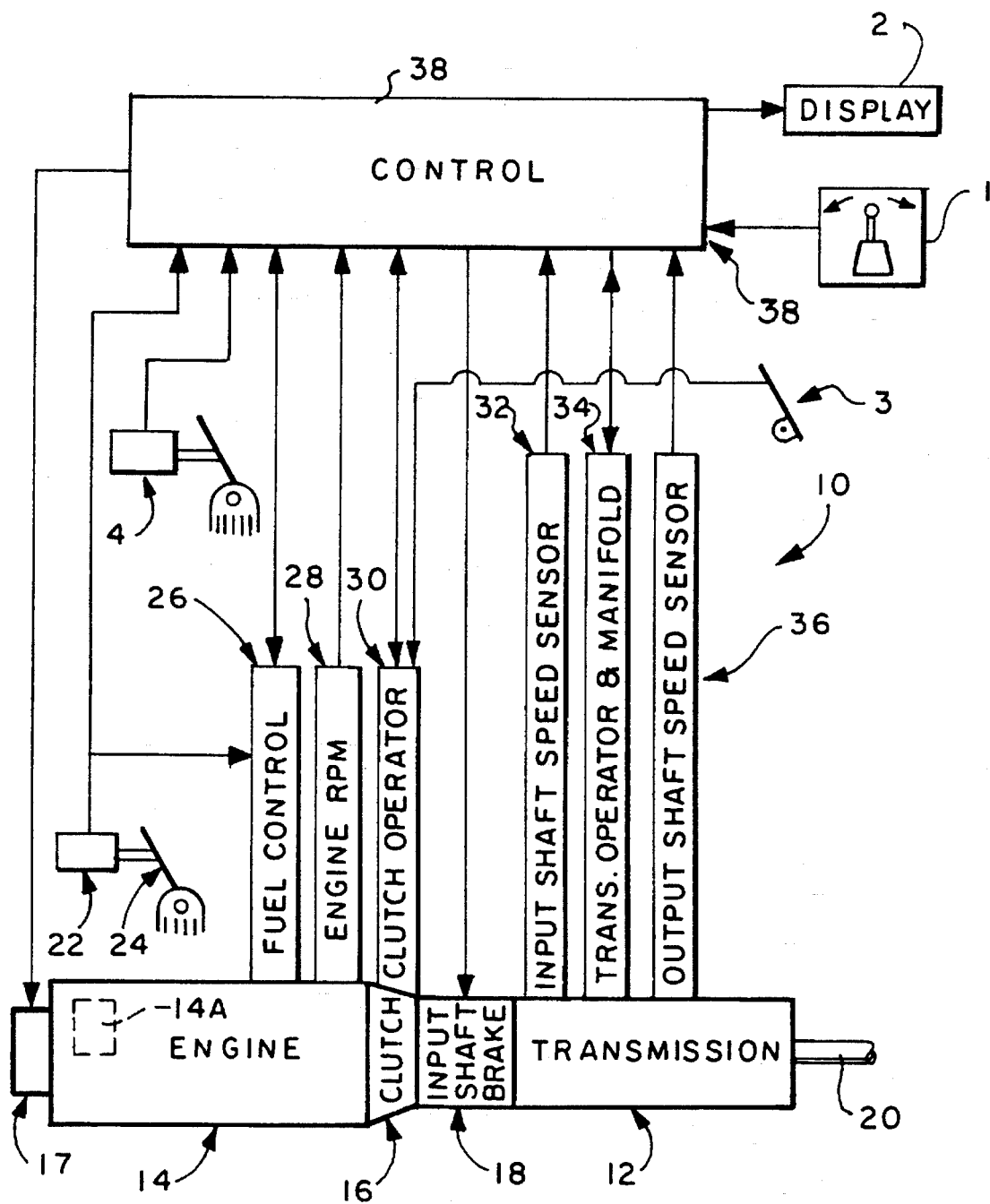
FIG. 1 is a schematic illustration of the semi-automatic mechanical change-gear transmission system of the present invention.

In the present description of the preferred embodiment, certain terminology will be used for descriptive purposes only and is not intended to be limiting. The terms "upward," "downward," "rightward" and "leftward" will refer to directions in the drawings to which reference is made. The terms "inward" and "outward" refer to directions towards and away from, respectively, the geometric center of the device, or portion thereof, being described. The foregoing applies to derivatives of the terms above specifically mentioned and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter-type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low-speed gear," "low gear" and/or "first gear" as used herein, shall all designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one and two ratios, respectively, from fourth and fifth speed, respectively, in the downshift direction.

The present invention is applicable, in principle, to the automatic or semi-automatic control of any type of mechanical change-gear transmission adaptable for providing input signals to and receiving command signals from electro-pneumatic control devices. However, the control system of the present invention is particularly advantageously applied to a splitter-type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No. 82303586.2, published Feb. 9, 1983 (EP-A-0071353), European Patent Application No. 83307061.8, published Sep. 5, 1984 (EP-A-0117342), and U.S. Pat. No. 4,735,109; 3,799, 002 and 4,440,037, the disclosures of which are incorporated herein by reference. Transmissions of the type illustrated in aforementioned U.S. Pat. No. 4,754,665 may be advantageously used in connection with the present invention.

The semi-automatic transmission system to which the present invention is particularly advantageously related is described and illustrated in European Patent application 85305072.2, published Feb. 5, 1986 (EP-A-0 170 465), and aforementioned U.S. Pat. No. 4,648,290.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground speed and engine speed is an indication of transmission input shaft speed, and vice versa, especially if clutch 16 is non-slippingly engaged.

The throttle position sensor 24 may be of the type illustrated in U.S. Pat. No. 4,922,425, the disclosure of which is incorporated by reference. Devices such as throttle position sensor assembly 22, for sensing the operator's setting of a throttle pedal 24 or the like, and providing a signal proportional to or at least indicative of the monitored setting, and so-called "remote fuel control" or "fly-by-wire" systems utilizing same, are known in the prior art and illustrated in the U.S. Pat. Nos. 4,250,845; 4,305,359; 4,319, 658 and 4,461,254, the disclosures of which are incorporated herein by reference.

Figure 2:
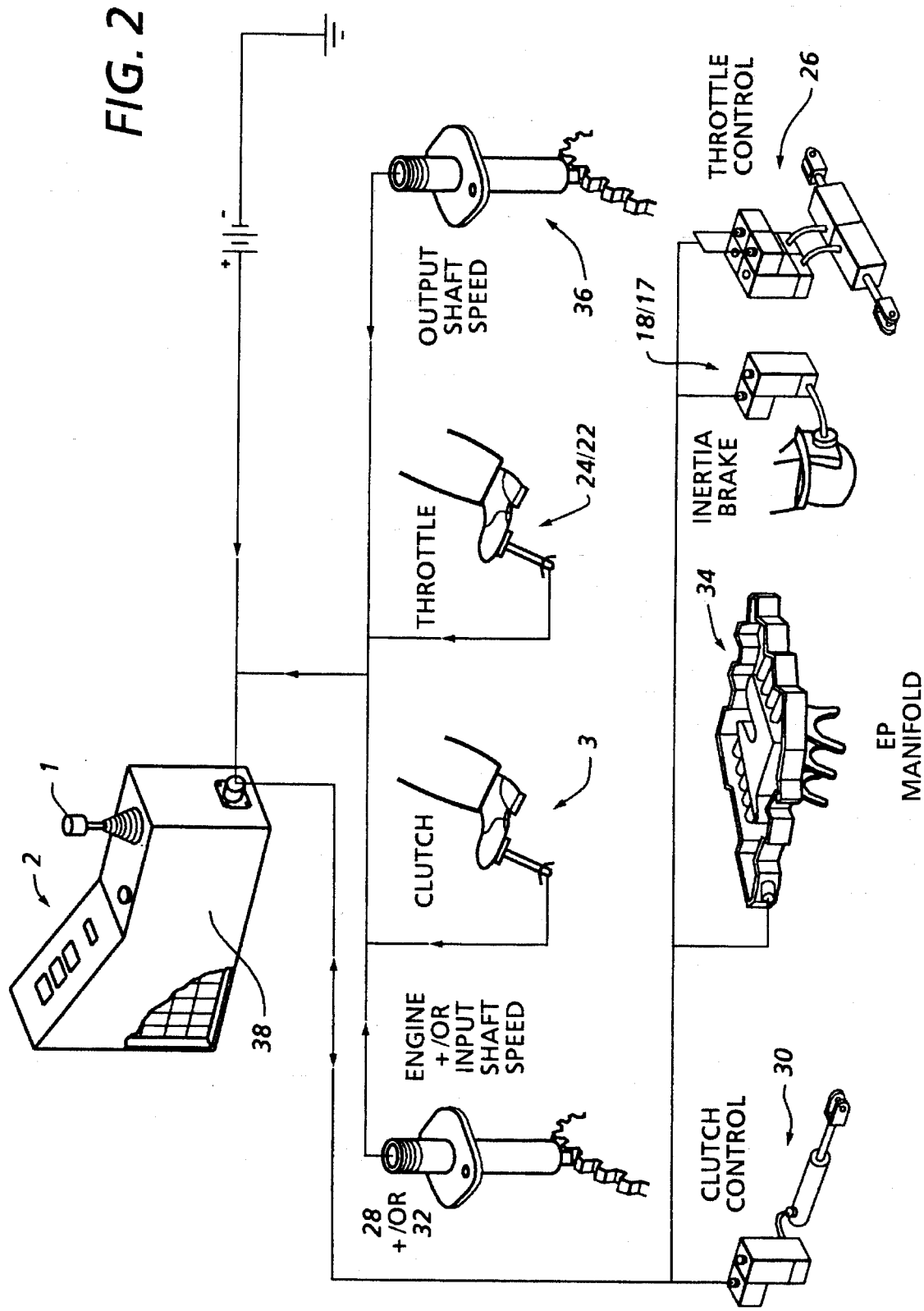
FIG. 2 is a schematic illustration of the control system of the semi-automatic transmission of the present invention.

Control logic circuits, sensors, and actuators for the transmission system 10 as disclosed in FIGS. 1 and 2, may be as disclosed in above-mentioned U.S. Pat. Nos. 4,361, 060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to control the supply of fuel to the engine 14 to achieve rapid synchronous rotation preparatory to a shift, clutch control via operator 30, and ratio shifting via transmission operator 34. The transmission operator 34 may also be of the "X-Y" type, as illustrated in U.S. Pat. Nos. 4,873,881 and 4,899,607, the disclosures of which are incorporated herein by reference.

Engine 14 may be electronically controlled, may include a dedicated controller 14A and may communicate with ECU 38 by means of an electronic data link conforming to SAE J1922, SAE J1939, ISO 11898 or similar protocol.

Although a clutch pedal 3 is illustrated for use in start-from-stop and low-speed maneuvering, the present invention also is applicable to automated mechanical transmission systems having a fully automatic master clutch.

The central processing unit also sends command output signals to the display 2 to be described in greater detail below. The semi-automatic transmission system 10 may additionally comprises a usual foot operated manual clutch control 3 intended for use only for start from rest and/or low speed creeping maneuvering situations. The control unit 38 receives signals indicative of manual clutch control 3 position and of actuation of the vehicle brakes 4. The semi-automatic mechanical transmission system 10 also includes sources of electric and/or pneumatic power (not illustrated).

The central processing unit 38 may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of which are incorporated by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3C:
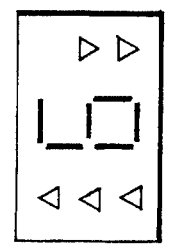
FIGS. 3B and 3C are enlarged views of a portion of the display illustrated in FIG. 3.
Figure 3B:
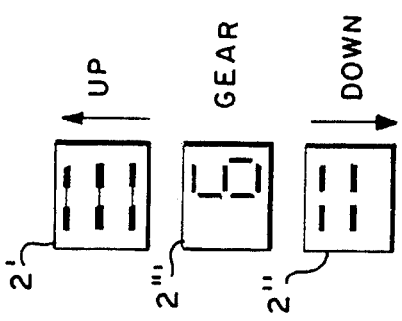
Figure 3:
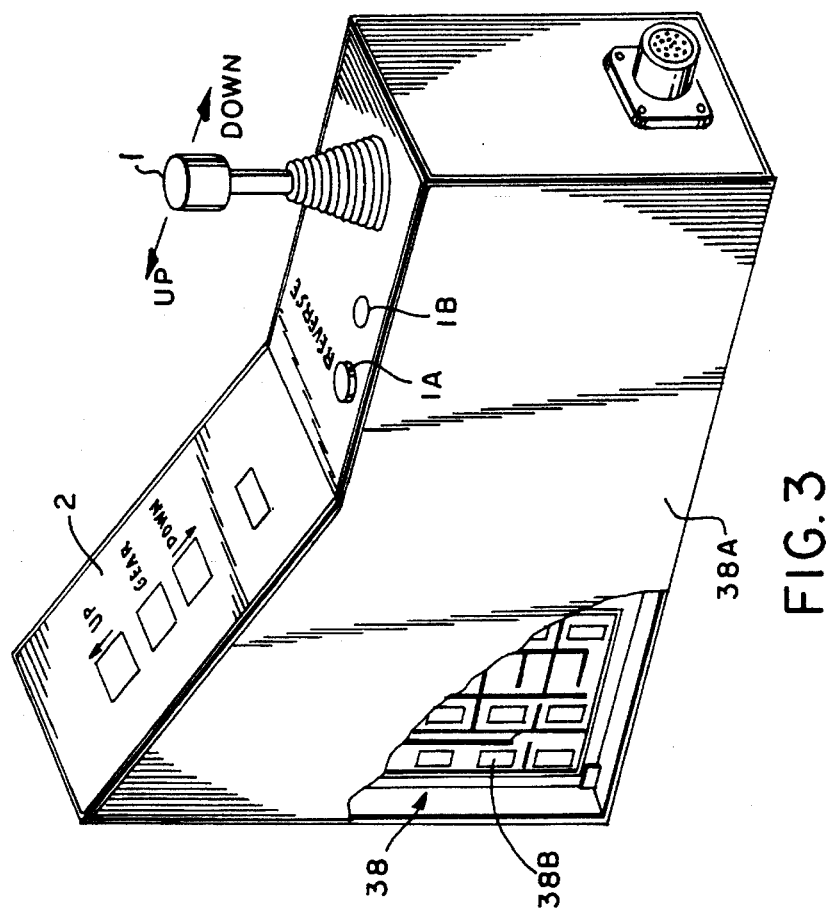
FIG. 3 is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Referring to FIG. 3B, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear. FIG. 3C illustrates an alternate display utilizing up/down arrows.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift (i.e., a shift to seventh gear), the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section (i.e., compound shifts) are equally simple for the driver to achieve as are those involving only the auxiliary section (i.e., a split shift). In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

Figure 3A:
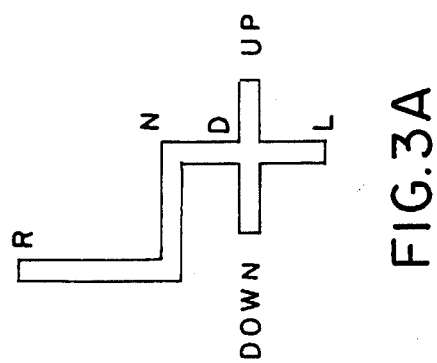
FIG. 3A is a schematic illustration of a shift selector pattern associated with an alternate type of automated mechanical transmission advantageously utilizing the present invention.

It is understood, especially for more fully automated transmissions, that a single control lever movable forward and backward in a given direction to select a forward and reverse mode of operation, and then movable in a transverse direction to select upshifts and downshifts either single or multiple, of the type disclosed in U.S. Pat. No. 4,442,730, the disclosure of which is incorporated herein by reference, may be substituted for the control lever 1 illustrated (see FIG. 3A). The selector lever 1 also may be replaced by any other type of selection device having a non-displaced condition and two distinct displaced conditions, such as a rocker switch, a pair of buttons or the like.

It is another important and advantageous feature of the semi-automatic control system of the present invention that, under certain conditions, the operator may select and the system will execute a direct shift into the default start ratio. For example, whenever the vehicle is brought to a complete stop, the clutch 16 is disengaged and the transmission is engaged in a relatively high gear ratio and the lever 1 is moved in the downshift direction once, the control will automatically shift transmission 12 to a preselected default start gear, which may involve skip-shifting over a large plurality of intervening gear ratios. By way of example, in a 12-forward-speed transmission, the permissible starting ratios may be first through fifth gears. By way of further example, when in neutral at stopped conditions with the clutch disengaged, a simple upshift request may result in a direct shift into the default start ratio.

Once in a start ratio, a lever movement in the downshift direction will the shift the transmission one ratio lower and one movement in the upshift direction will shift the transmission one ratio higher. The operator, at rest or in motion, can always select a gear ratio from those permitted. The manual clutch pedal, if utilized, is intended only for use preparatory to stopping to disengage the transmission and avoid stalling and during starting from rest in any of the permissible starting gear ratios.

According to the present invention, as schematically illustrated in the flow chart of FIG. 4, if the operator allows the vehicle ground speed to fall below a reference value (usually at or almost a full stop), and the master clutch 16 is manually or automatically disengaged, a single movement or pulse of lever 1 in the downshift direction from a gear ratio higher than an allowable starting gear will be interpreted as a request for automatic selection and direct engagement of either transmission neutral or a preselected default start ratio. Under similar conditions, a single movement or pulse of lever 1 in the upshift direction from neutral will be interpreted as a request for automatic selection and direct engagement of the preselected default start ratio. When in the range of allowable start gear ratios (usually first through fifth for a 12-speed and first through seventh for an 18-speed transmission) a single movement or pulse in the up- or downshift direction will be interpreted as a request for a single up- or downshift, respectively.

A single movement or pulse of the lever is a movement of the lever from the centered position to a displaced position, in either the upshift or downshift direction, and then the immediate release of the lever allowing the lever to return to the centered position thereof. If the control lever 1 is retained in the displaced position for more than a predetermined period of time (for example, for more than one or two seconds), an alternate control logic may be utilized.

In the prior art transmission systems, the predetermined/preselected default start gear was a preset fixed ratio or a ratio determined by the electronic control unit in view of sensed system parameters and predetermined logic rules. The preselected ratio was often different from the specific start ratio desired by the operator on the basis of his knowledge of vehicle loading, operating terrain, traffic conditions, weather conditions and the like.

Figure 4:
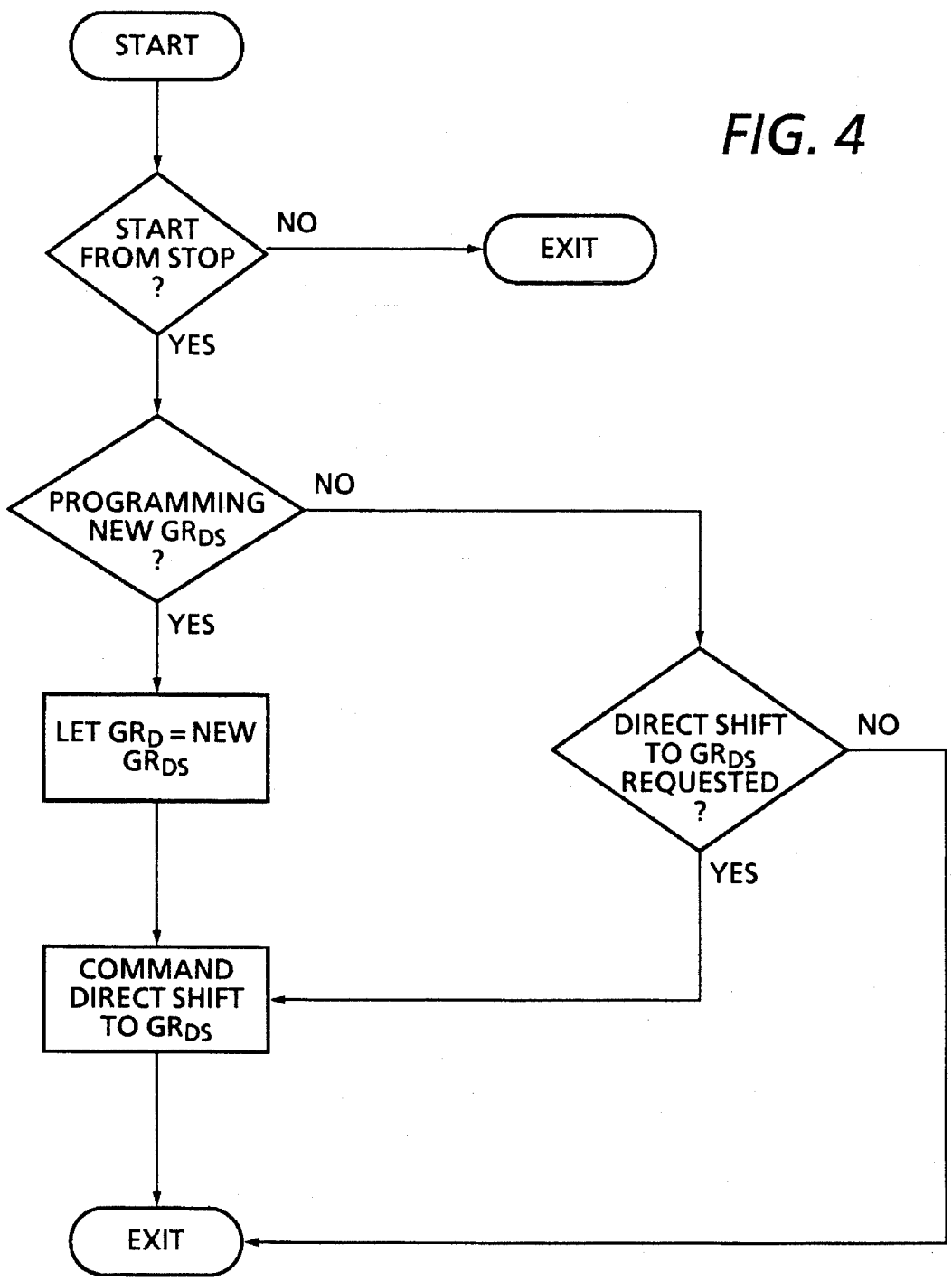
FIG. 4 is a schematic illustration, in the form of a flow chart, of the control system/method of the present invention.

In accordance with the present invention, as illustrated in FIG. 4, if the vehicle operator is dissatisfied with the current default start ratio, a new default start ratio may be quickly and easily programmed.

In a first embodiment, a start selection ratio button 1B may be provided, and the operator will upshift or downshift to the desired default ratio and then simply depress/release the button to program a new default ratio.

In another embodiment, the operator will move the selector 1 in the upshift or downshift direction until the desired default ratio is selected, and will then hold the lever in the displaced position for a given time period (such as two or three seconds), which will automatically cause the then-selected ratio to be programmed as the new default ratio and, upon release of the selector, a direct shift to the selected ratio. Preferably, the operator will be informed by audio or visual means (a chime or a flashing display) when a new default ratio has been programmed.

In a further embodiment of the present invention, the operator selects the chosen new default start ratio by operation of the selector 1. Then, the selector is moved to a displaced position (such as the up select position) and held in this position for a period of time (such as two or three seconds) until the system confirms that a new default ratio has been selected.

In yet another embodiment of the present invention, the control is effective to scroll through display indications of allowable start ratios if the control is maintained in a displaced position for greater than a predetermined period of time (see allowed, copending U.S. Ser. No. 08/104,699, the disclosure of which is incorporated herein by reference). In this logic, if scrolling selection of a start gear is utilized, the selected ratio will be the new default start ratio.

By this control strategy, the present value for the preselected start ratio always reflects the vehicle operator's latest selection of the most desirable default start-from-stop ratio.

Although the preferred embodiments of the present invention have been described with a certain degree of particularity, various changes to form and detail may be made without departing from the spirit and scope of the invention as hereinafter claimed.

We claim:

1. A method of controlling an automated mechanical change-gear transmission system (10) comprising a fuel throttle control (24), a fuel throttle-controlled engine (14), a multi-speed, change-gear mechanical transmission (12) having a lowest grouping of gear ratios (first through fifth), each suitable for start-from-stop operation and having a specific ratio within said lowest grouping of ratios determined to be the predetermined default start ratio ($GR_{DS}$), a central processing unit (38) for receiving inputs and for processing same according to predetermined logic rules to issue command output signals to non-manually controlled operators including a transmission operator (34), said processing unit sensing system parameters indicative of a requirement for a shift directly into the default start ratio and effective to issue command output signals for a shift directly into the default start ratio, said method comprising:

providing a series of actions for operator manual selection of a new default start ratio ($GR_{DS}$).

2. The method of claim 1 wherein said system further comprises a manually operable selector (1) displaceable in a first direction for selecting upshifts and displaceable in a second direction for selecting downshifts, said input signals include signals indicative of the operation of said selector, and said series of actions comprises manipulation of said selector.

3. The method of claim 2 wherein said series of actions comprises retaining said selector displaced in one of said first or second directions for greater than a reference period of time.

4. The method of claims 1, 2 or 3 further comprising signaling the operator upon completion of selection of a new default start ratio.

5. A machine for controlling an automated mechanical change-gear transmission system (10) comprising a fuel throttle control (24), a fuel throttle-controlled engine (14), a multi-speed, change-gear mechanical transmission (12) having a lowest grouping of gear ratios (first through fifth), each suitable for start-from-stop operation and having a specific ratio within said lowest grouping of ratios determined to be the predetermined default start ratio, a central processing unit (38) for receiving inputs and for processing same according to predetermined logic rules to issue command output signals to non-manually controlled operators including a transmission operator (34), said processing unit sensing system parameters indicative of a requirement for a shift directly into the default start ratio and effective to issue command output signals for a shift into the default start ratio, said machine characterized by:

said logic rules including rules for providing a series of actions for operator manual selection of a new default start ratio ($GR_{DS}$).

6. The machine of claim 5 wherein said system further comprises a manually operable selector (1) displaceable in a first direction for selecting upshifts and displaceable in a second direction for selecting downshifts, said input signals include signals indicative of the operation of said selector, and said series of actions comprises manipulation of said selector.

7. The machine of claim 6 wherein said series of actions comprises retaining said selector displaced in one of said first or second directions for greater than a reference period of time.

8. The machine of claims 5, 6 or 7 wherein said logic rules further comprise rules for signaling the operator upon completion of selection of a new default start ratio.

9. A method of controlling an automated mechanical change-gear transmission system (10) comprising a fuel throttle control (24), a fuel throttle-controlled engine (14), a multi-speed, change-gear mechanical transmission (12) having a lowest grouping of gear ratios (first through fifth), each suitable for start-from-stop operation and having a specific ratio within said lowest grouping of ratios determined to be the predetermined default start ratio ($GR_{DS}$), a manually operated shift selection lever (1) displaceable in a first direction to select upshifts and in a second direction to select downshifts, a central processing unit (38) for receiving input signals including signals indicative of operation of said selection lever and of a currently engaged ratio of the transmission and for processing same according to predetermined logic rules to issue command output signals to non-manually controlled operators including a transmission operator (34), said processing unit interpreting a first predetermined combination of operations of said manual shift selection lever and system parameters as a selection of a shift directly into the predetermined default start ratio, said method comprising:

interpreting a second predetermined combination of operations of said manual shift selection lever and system parameters as a request to select a new default start ratio.

10. The method of claim 9 wherein said second predetermined combination of operations of said manual shift selection lever and system parameters comprises, after a direct shift into the current default ratio as a result of satisfying said first predetermined combination, utilizing said shift selection lever to manually request a shift from the current default start ratio into the new default start ratio.

11. The method of claim 10 wherein said second predetermined combination further comprises retaining said manual shift selection lever displaced in one of said first or second directions for greater than a reference period of time.

12. The method of claim 10 wherein said second predetermined combination requires retaining said selection lever displaced upon selection of said new default start ratio.

13. The method of claim 10 wherein said second predetermined combination requires retaining said selection lever displaced immediately after selection of a new default start ratio and return of said selection lever to the non-displaced position thereof.

14. The method of claim 10 wherein retaining said selection lever displaced for greater than said reference period of time causes a scrolling display of selectable start gear ratios and thereafter allowing said lever to move from the displaced position thereof, will be interpreted as selection of the then-displaced ratio as the new default start ratio.

15. The method of claims 11, 12, 13 or 14 wherein said reference period of time is about two to three seconds.

16. The method of claims 9, 10, 11, 12, 13 or 14 further comprising signaling the operator upon completion of selection of a new default start ratio.

17. A machine for controlling an automated mechanical change-gear transmission system (10) comprising a fuel throttle control (24), a fuel throttle-controlled engine (14), a multi-speed, change-gear mechanical transmission (12) having a lowest grouping of gear ratios (first through fifth), each suitable for start-from-stop operation and having a specific ratio within said lowest grouping of ratios determined to be the predetermined default start ratio ($GR_{DS}$), a manually operated shift selection lever (1) displaceable in a first direction to select upshifts and in a second direction to select downshifts, a central processing unit (38) for receiving input signals including signals indicative of operation of said selection lever and of a currently engaged ratio of the transmission and for processing same according to predetermined logic rules to issue command output signals to non-manually controlled operators including a transmission operator (34), said processing unit interpreting a first predetermined combination of operations of said manual shift selection lever and system parameters as a selection of a shift directly into the predetermined default start ratio, said machine characterized by said logic rules including logic rules for:

interpreting a second predetermined combination of operations of said manual shift selection lever and system parameters as a request to select a new default start ratio.

18. The machine of claim 17 wherein said second predetermined combination of operations of said manual selection lever and system parameters comprises, after a direct shift to said current default start ratio as a result of satisfying said first combination, utilizing said shift selection lever to manually request a shift from the current default start ratio into the new default start ratio.

19. The machine of claim 18 wherein said second predetermined combination further comprises retaining said manual shift selection lever displaced in one of said first or second directions for greater than a reference period of time.

20. The machine of claim 18 wherein said second predetermined combination requires retaining said selection lever displaced upon selection of said new default start ratio.

21. The machine of claim 18 wherein said second predetermined combination requires retaining said selection lever displaced immediately after selection of a new default start ratio and return of said selection lever to the non-displaced position thereof.

22. The machine of claim 18 wherein said logic rules include rules whereby retaining said selection lever displaced for greater than said reference period of time causes a scrolling display of selectable start gear ratios and thereafter allowing said lever to move from the displaced position thereof, will be interpreted as selection of the then-displaced ratio as the new default start ratio.

23. The machine of claims 19, 20, 21 or 22 wherein said reference period of time is about two to three seconds.

24. The machine of claims 17, 18, 19, 20, 21 or 22 wherein said logic rules include rules for signaling the operator upon completion of selection of a new default start ratio.

* * * * *